Feb. 5, 1963
E. A. RICCI
3,076,254
DE-BURRING TOOL
Filed Oct. 31, 1960
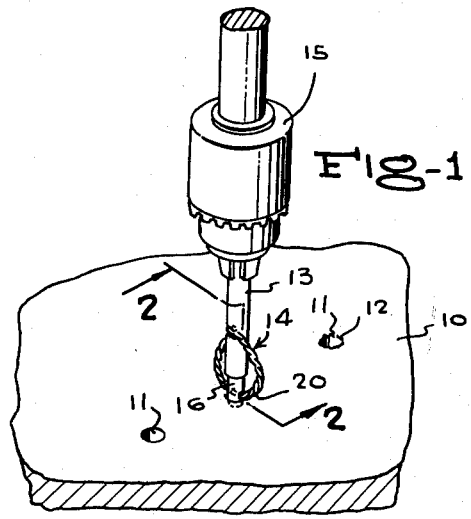
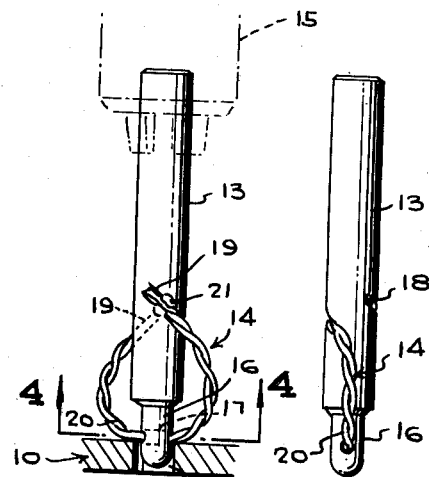
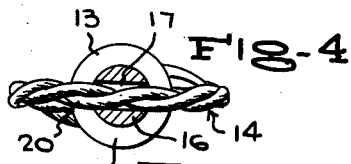
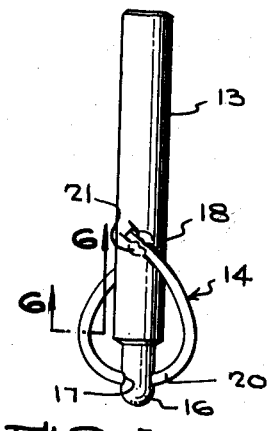
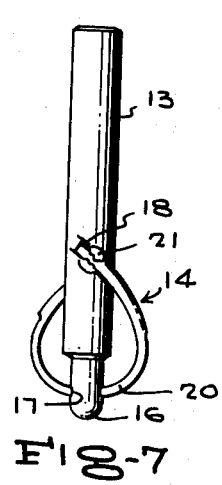
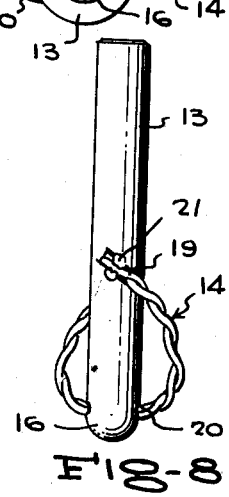
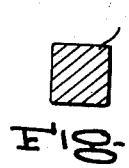
INVENTOR.
ERNEST A. RICCI
BY
Christian R. Nielsen
ATTORNEY United States Patent Office 3,076,254
Patented Feb. 5, 1963

3,076,254
DE-BURRING TOOL
Ernest A. Ricci, Royersford, Pa.
(1477 Sunset Drive, Pottstown, Pa.)
Filed Oct. 31, 1960, Ser. No. 66,018
3 Claims. (Cl. 29—90)

This invention relates to burr cutting tools and more particularly to a tool for removing undesired metal formed when drilling holes in metal or similar materials, and it consists in the constructions, arrangements and combinations herein described and claimed.

It is an important object of the invention to provide a burr cutting tool in which the shank of the tool is provided with a pilot member which is positioned forwardly of the operative or cutting member adapted to pass into an opening formed in metal or like parts which was formed by a drilling operation, the pilot member maintaining the tool centered within the opening and will also prevent the tool from jumping out of the opening under rotation of the tool, which in many cases will mar the surface of the work.

More specifically, it is an important object of the invention to provide a novel construction of burr cutting members in the form of an elliptical loop having cutting edges, the bight portion of which is maintained in proper cutting position by passage through an opening formed in the pilot portion of the shank of the cutting tool; terminal ends of the cutting members being confined in slots formed upon opposite sides of the shank, the edges of the slots being swaged or upset for retention of respective ends of the cutting member.

Additional objects, advantages and features of invention will be apparent from the following description, considered in conjunction with the accompanying drawing, wherein, FIGURE 1 is a perspective view of a drill chuck illustrating the burr cutting member in use, FIGURE 2 is a sectional view taken on the line 2—2 of FIGURE 1, the cutting tool being shown in elevation, FIGURE 3 is a side elevation of the cutting tool as seen at right angles to that shown in FIGURE 2.

FIGURE 4 is an enlarged cross section taken on the line 4—4 of FIGURE 2.

FIGURE 5 is a side elevation of a modification of the cutting element.

FIGURE 6 is an enlarged cross section taken on the line 6—6 of FIGURE 5.

FIGURE 7 is a further form of the cutting element.

FIGURE 8 is a still further form of the cutting element, and

FIGURES 9 and 10 are enlarged cross sections illustrating further modifications of the cutting elements.

In the metal working arts, it is well known that when metallic parts are drilled to form openings, the drill will leave small upstanding burrs around the periphery of the opening or openings, which must be removed and it is to this end that the present invention pertains.

In order to readily understand the construction of the cutting tool and the operation thereof, attention is invited particularly to FIGURES 1 and 2 of the drawing wherein a piece of work 10 is illustrated in which a row of openings 11 are being worked upon to remove the burrs 12. As shown, the shank 13 of the cutting totol 14 is rotated by a drill chuck 15.

The shank 13 is provided with a pilot member 16, of reduced diameter, which of course, may be formed in various diameters so as to be applicable to various sized openings. The pilot member is formed with a transverse opening 17 and at a suitable distance upwardly from the terminal end thereof, the shank is provided with angularly disposed cuts or kerfs 18, these cuts being arranged upon opposite sides of the shank and extend in angular relation with respect to one another and of a suitable depth, for a purpose as will presently appear. The above construction applies to all shanks disclosed in the several figures of the drawings.

The cutting element 14 as shown in FIGURES 1 to 4 and 8 are of like construction and referring to these views, the cutting element is preferably formed from a two strand twisted galvanized aircraft cable, an end 19 of which is extended through the opening 17 of the pilot member, the ends 19 of the cable are positioned in respective kerfs 18 for securement therein, as will be explained, but prior to such fastening of the ends of the cable, the cable is suitably bent to form an elliptical bight portion 20. Obviously, the bight portion may be formed so as to have any desired arcuate diameter in order that it may be applicable to a given sized opening in a piece of work.

It will be noted that the opening 17 of FIGURES 1 to 3 is positioned a distance inwardly of the terminal end of the pilot member, which is also the case in FIGURE 8, but in the latter instance, the shank 13 and the pilot 16 is of the same diameter, which is desirable when deburring deep holes.

The terminal ends 19 of the cutting element are positioned in respective kerfs and the metal at the sides of the kerfs is then upset or swaged as at 21 to overlie and firmly impinge upon the ends 19.

In FIGURE 5, the cutting element 14 is illustrated as a single steel strand of triangular formation in cross section, as shown in FIGURE 6; and in FIGURES 7 and 9, the cutting element is shown as of square formation; while in FIGURE 10 a further form is shown, in which a single cutting edge 22 is employed. The cutting element of the above constructions are formed from a high carbon wire and are hardened after the tool has been constructed. These forms of the cutting element may be re-sharpened and are employed in de-burring soft steel, hard fiber, plastics and hard non-ferrous materials.

All of the above forms of cutting element may be employed in drill chucks or collets as desired, and it will be seen that with the pilot 16 positioned in a hole to be de-burred, the bight portion 20 will engage the edge of the hole where the objectionable burrs are located and upon rotation of the cutting element under light pressure, the burrs will be readily and cleanly removed.

While I have shown and described preferred forms of the device, this is by way of illustration only, and I consider as my own all such modifications in construction as fairly fall within the scope of the appended claims.

I claim:

1. A deburring tool for deburring the edges of a hole in a workpiece comprising a rotary shank element having an axis of rotation and a deburring element; said shank element having a holding end and a working end, said working end being rounded at its terminus for guiding insertion in a hole and having a cylindrical portion adjacent said terminus, said working end further having a transverse bore whose axis is transverse to said rotary axis in said cylindrical portion adjacent said rounded terminus, and kerfs on opposite sides of said working end remote from said terminus in general directional alignment with said bore, said kerfs being oppositely angled one to the other, said deburring element being bendable and deformable and passing freely through said bore and having end portions firmly fixed in said kerfs to form a single looped shaped deburring element.

2. A deburring tool of claim 1 wherein said deburring element is a twisted wire cable.

3. A deburring tool of claim 1 wherein the said deburring element is a single strand having angular corners.

(References on following page)

References Cited in the file of this patent

UNITED STATES PATENTS

| | | |
|---|---|---|
| 475,733 | McNutt | May 24, 1892 |
| 734,617 | Ruggles | July 28, 1903 |
| 1,147,824 | Soule | July 27, 1915 |
| 1,373,999 | Drummond | Apr. 5, 1921 |
| 1,562,327 | Hedeen | Nov. 17, 1925 |
| 1,588,737 | Hurd | June 15, 1926 |
| 1,685,380 | Shultz | Sept. 25, 1928 |
| 1,721,106 | Fishbeck | July 16, 1929 |
| 2,450,075 | Bashara | Sept. 28, 1948 |
| 2,732,612 | Hallock | Jan. 31, 1956 |